United States Patent
Campbell et al.

(10) Patent No.: US 10,233,013 B2
(45) Date of Patent: *Mar. 19, 2019

(54) AGRICULTURALLY ACTIVE PRODUCT

(71) Applicant: DOW AGROSCIENCES LLC, Indianapolis, IN (US)

(72) Inventors: Donald B. Campbell, Indianapolis, IN (US); James M. Breuninger, Indianapolis, IN (US); Charles W. Arnett, Indianapolis, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,190

(22) Filed: Feb. 17, 2017

(65) Prior Publication Data

US 2017/0158421 A1 Jun. 8, 2017

Related U.S. Application Data

(63) Continuation of application No. 14/738,623, filed on Jun. 12, 2015, now Pat. No. 9,604,774, which is a continuation of application No. 13/705,648, filed on Dec. 5, 2012, now Pat. No. 9,125,339.

(51) Int. Cl.
| | |
|---|---|
| *B65D 75/20* | (2006.01) |
| *B65D 85/00* | (2006.01) |
| *A01C 21/00* | (2006.01) |
| *B65D 85/52* | (2006.01) |
| *B65D 75/52* | (2006.01) |

(52) U.S. Cl.
CPC .............. *B65D 85/70* (2013.01); *A01C 21/00* (2013.01); *A01C 21/005* (2013.01); *B65D 75/20* (2013.01); *B65D 75/52* (2013.01); *B65D 85/52* (2013.01)

(58) Field of Classification Search
CPC .... A01N 2300/00; A01N 39/04; A01N 25/04; A01N 25/34; A01N 53/00; A01N 37/40; A01N 43/70; A01N 57/20; A01C 21/00; A01C 21/005; A01C 15/003; A01C 1/044; A01C 7/044
See application file for complete search history.

(56) References Cited

U.S. PATENT DOCUMENTS

| | | | |
|---|---|---|---|
| 4,168,002 A | 9/1979 | Crosby | |
| 5,222,595 A | 6/1993 | Gouge et al. | |
| 5,279,421 A | 1/1994 | Gouge et al. | |
| 5,558,228 A | 9/1996 | Jackisch et al. | |
| 5,691,015 A | 11/1997 | Tsukamoto et al. | |
| 6,068,115 A | 5/2000 | Boulton | |
| 6,394,273 B1 | 5/2002 | Dixon | |
| 7,624,869 B2 | 12/2009 | Primer | |
| 9,125,339 B2 * | 9/2015 | Campbell | .............. A01C 21/00 |
| 9,604,774 B2 * | 3/2017 | Campbell | .............. A01C 21/00 |
| 2007/0163172 A1 | 7/2007 | Savich | |
| 2008/0210589 A1 | 9/2008 | Fontana | |
| 2015/0274408 A1 | 10/2015 | Campbell | |

FOREIGN PATENT DOCUMENTS

| | | |
|---|---|---|
| CN | 1068794 | 2/1993 |
| EP | 2289816 | 3/2011 |
| JP | Y-1956015390 | 9/1956 |
| JP | U-S59-155980 | 9/1984 |
| JP | A-H07-500301 | 1/1995 |
| JP | A-H11-75661 | 3/1999 |
| JP | 2001139040 | 5/2001 |
| JP | 2001240159 | 9/2001 |
| WO | 9217381 | 10/1992 |
| WO | 1993008095 | 4/1993 |
| WO | 1993023999 | 12/1993 |
| WO | 1995019921 | 7/1995 |
| WO | 2008140575 | 11/2008 |

OTHER PUBLICATIONS

Supplementary European Search Report for EP 13860877, dated Sep. 30, 2016, 10 pages.
Images of Chinese Super Gallant Herbicide and Success 25SC Insecticide packages and translations thereof, 6 pages, available at least as early as Dec. 4, 2012.
Photograph of various packages, 1 page, available at least as early as Dec. 4, 2012.
Five photographs of a bottle of Bayer Advanced-Brand Brush Killer, 5 pages, available at least as early as Dec. 4, 2012.
International Search Report in PCT Application No. PCT/US2013/072826, 3 pages, dated Jun. 6, 2014.
Ridomil Gold Pamphlet, Copyright to Novartis, 1997.

* cited by examiner

*Primary Examiner* — Audrea B Coniglio

(57) ABSTRACT

Agriculturally active products are disclosed that are used to eliminate or otherwise control pests.

20 Claims, 7 Drawing Sheets

AGRICULTURALLY ACTIVE PRODUCT

CROSS REFERENCE TO RELATED APPLICATIONS

This application is a continuation of U.S. patent application Ser. No. 14/738,623, filed Jun. 12, 2015, which is a continuation of U.S. patent application Ser. No. 13/705,648, filed Dec. 5, 2012, now U.S. Pat. No. 9,125,339, the disclosures of which are hereby expressly incorporated by reference herein in their entirety.

FIELD

The present invention relates to agriculturally active products that are used to eliminate or otherwise control pests and/or regulate plant growth.

BACKGROUND

Gardeners and other caretakers of plants use agriculturally active products to eliminate or otherwise control pests, such as weeds, insects, and fungus and/or to control the growth of plants. Typically, these agriculturally active products include one or more agriculturally active ingredients, such as herbicides, insecticides, fungicide, plant growth regulators, surfactants, shelf-life extenders, plant health products, etc., and inert ingredients, if any. The agriculturally active products typically also include a package or container used to contain these ingredients until the ingredients are dispensed in a delivery device, such as a sprayer, where the ingredients may be mixed with water for application on the undesired weeds and/or the desirable plants in need of treatment.

SUMMARY

According to one aspect of the present invention, an agriculturally active product is provided. The product includes an amount of agriculturally active ingredient sufficient to effectively treat a coverage area of vegetation and an unopened package having an interior region containing the agriculturally active ingredient. The package has an exterior surface area. A ratio of the exterior surface area to the coverage area is greater than 17,500 square centimeters per acre.

According to another aspect of the present invention, another agriculturally active product is provided. The product includes a volume of material including an agriculturally active ingredient and a package having a package centroid, an interior region, and a distant portion positioned farthest away from the package centroid. The interior region has an interior region centroid and contains the volume of material. The interior region centroid is spaced apart from the package centroid by an offset distance. The distant portion is spaced apart from the package centroid by a farthest distance. A ratio of the offset distance to the farthest distance is greater than 0.10.

According to another aspect of the present invention, another agriculturally active product is provided. The product includes an amount of agriculturally active ingredient sufficient to effectively treat a coverage area of vegetation and an unopened package having at least one sealed portion including an interior surface area defining an interior region containing the agriculturally active ingredient. A ratio of the interior surface area to the coverage area is greater than 10,000 square centimeters per acre.

According to another aspect of the present invention, another agriculturally active product is provided. The product includes a volume of material including an agriculturally active ingredient and a sealed package having an interior region containing the volume. The sealed package has an exterior surface area. A ratio of the exterior surface area to the volume is greater than 10 square centimeters per milliliter.

According to another aspect of the present invention, another agriculturally active product is provided. The product includes a weight of material including an agriculturally active ingredient and an unopened package having an interior region containing the material. The unopened package has an exterior surface area. A ratio of the exterior surface area to the weight of material is greater than 9 square centimeters per gram.

According to another aspect of the present invention, another agriculturally active product is provided. The product includes an initial volume of an agriculturally active ingredient and a package having an interior region containing the initial volume. The package has an exterior surface area. A ratio of the exterior surface area to the initial volume is greater than 500 square centimeters per milliliter.

According to another aspect of the present invention, another agriculturally active product is provided. The product includes an initial weight of an agriculturally active ingredient and a package having an interior region containing the initial weight. The package has an exterior surface area. A ratio of the exterior surface area to the initial weight is greater than 500 square centimeters per gram.

According to another aspect of the present invention, another agriculturally active product is provided. The product includes an agriculturally active ingredient and a package having at least one sealed storage portion and a remainder portion coupled to the at least one sealed storage portion. The at least one sealed storage portion includes at least one interior region containing the agriculturally active ingredient. The at least one sealed storage portion has a first exterior surface area. The remainder portion has a second exterior surface area. A ratio of the first exterior surface area to the second exterior surface area is less than 1.25.

According to another aspect of the present invention, another agriculturally active product is provided. The product includes a volume of material including an agriculturally active ingredient and a package having a sealed storage portion and a remainder portion coupled to the sealed storage portion. The sealed storage portion contains the volume of the material. The remainder portion has an exterior surface area. A ratio of the exterior surface area to the volume is greater than 5 square centimeters per milliliter.

According to another aspect of the present invention, another agriculturally active product is provided. The product includes an agriculturally active ingredient and a substantially flat package having at least one sealed storage portion. The at least one sealed storage portion includes a total interior surface area defining a total interior region containing the agriculturally active ingredient. The package has an exterior surface area. A ratio of the exterior surface area to total interior surface area is greater than 1.75.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Figure 1:
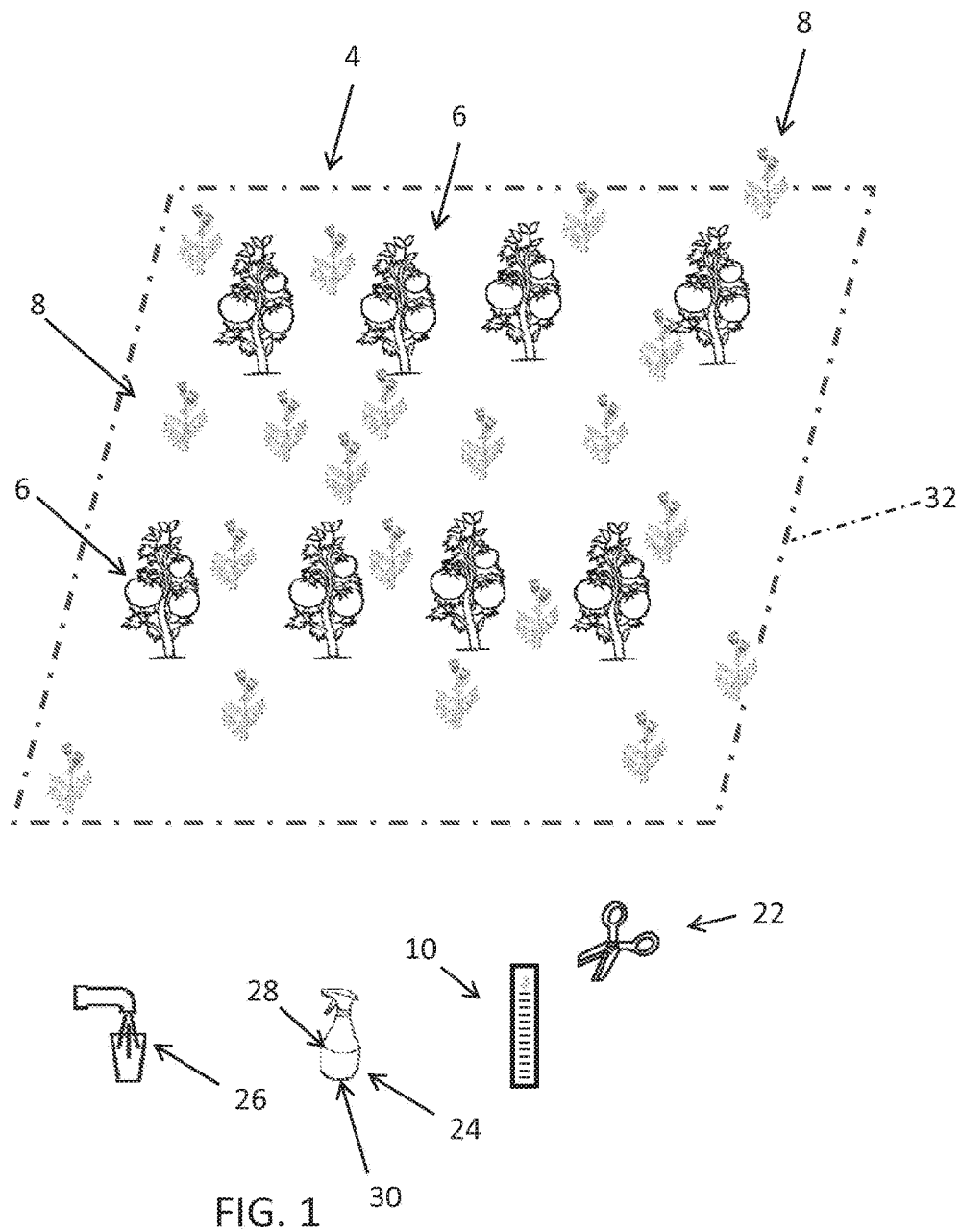
FIG. 1 is a view of a garden, landscaping, or other area that possibly contains weeds, insects, fungus or other pests that are undesirable and possibly contain desirable plants requiring growth regulation.

Referring to FIG. 1, a garden, landscaping, or other area 4 containing desirable plants 6 (ex. tomato plants, grass, crops, landscape plantings, etc.), and pests 8 (ex, thistles and other weeds, insects, fungus, etc.) are shown. To control or eliminate pests 8 from garden area 8, an agriculturally active product 10 is provided that contains an herbicide, insecticide, fungicide, plant growth regulator, surfactant, shelf-life extender, plant health product or other agriculturally active ingredient 12 that is sprayed or otherwise applied to pests 8 and/or desirable plants 6. Product 10 includes a package 14 and a material 16 (shown in FIG. 5 contained within package 14). Typically, material 16 includes one or more agriculturally active ingredients 12 and one or more inert ingredients 18, such as water or other filler. Package 14 is sealed to define one or more interior regions 20 (see FIG. 5) that contain material 16.

In use, a user opens package 14 by hand, or with a pair of scissor 22 or another device to unseal interior region 20. Package 14 could also be opened without a tool by providing package 14 with a slit on an edge, pull strip, etc or without such structure for assisting in opening package 14. After opening package 14, the user pours material 16 into a container 24, such as a spray bottle, hose-end sprayer, etc. Before or after pouring material 16 into container 24, a predetermined volume of water 26 is also poured into container 24 to make a predetermined volume 28 of dilute mixture 30. Pre-determined volume 28 of dilute mixture 30 is sufficient to treat a predetermined coverage area 32 based on the dosage rate for active ingredient 12.

Figure 2:
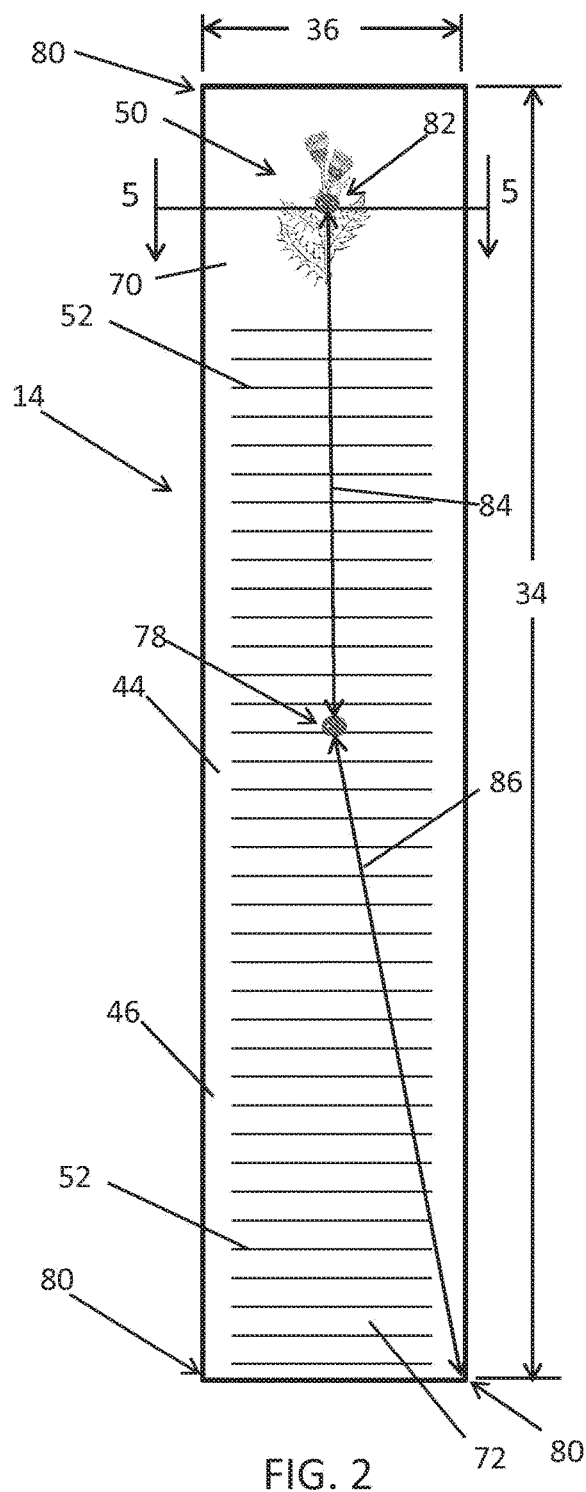
FIG. 2 is a top plan view of an agriculturally active product that includes a package having an agriculturally active ingredient contained in the package.
Figure 5:
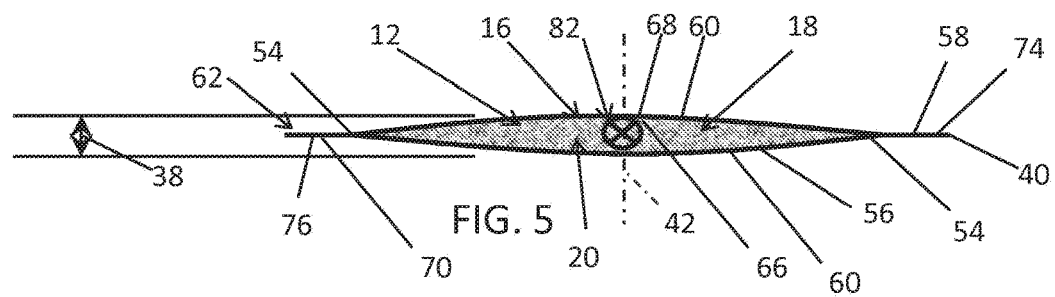
FIG. 5 is a cross-sectional view taken along line 5-5 of FIG. 4 showing the sealed upper portion of the package defining an interior region that contains the agriculturally active ingredient.

As shown in FIG. 2, package 14 is relatively long having a height 34 that is substantially greater than its width 36 and thickness 38 (see FIG. 5). According to one embodiment of the present disclosure, height 34 is 33.3 centimeters; width 36 is 6.5 centimeters; and thickness 38 ranging from 0.21 millimeters near edges 40 of package 14 to 5 millimeters near center line 42 of package 14 depending on the amount of material 16 contained within package 14. The total exterior surface area 44 of package 14 is preferably about 433 square centimeters including front 46 (FIG. 2) and back 48 (FIG. 3) of package 14. According to other embodiments, other sizes and shapes of packages can be provided. For example, according to some embodiments, height 34 may range from 3 to 100 centimeters and width 36 may range from 3 to 20 centimeters. Accordingly, these embodiments may have total exterior surface areas 44 ranging from 18 square centimeters to 4,000 square centimeters. Other widths, heights, and total exterior surfaces areas may also be provided.

As shown in FIG. 2, front 46 of package 14 includes graphics 50 that may depict a specific pest 8 (ex. thistles) treated by active ingredient 12, a company logo, and other information. Package 14 also includes text 52 on front 46 and back 48 (see FIG. 3) that preferably contains information identifying the composition of material 16; cautions; safety recommendations; first aid instructions; listings of potential environmental, physical and chemical hazards; directions for use including the predetermined volume of water to be mixed with material 16; precautions and restrictions; terms and conditions of use, warranty disclaimers; etc. Text 52 may also indicate predetermined coverage area 32 and the dosage rate.

According to the preferred embodiment of the present disclosure, coverage area 32 is relatively small. For example, according to one embodiment, coverage area 32 is about 5.57 square meters (60 square feet or 0.0014 acres). During application of dilute mixture 30, the user may uniformly spray or otherwise apply mixture 30 over an area equal to coverage area 32. Alternatively, the user may spot treat pests 8 over a larger area by only applying mixture 30 to pests 8 and not to surrounding areas without pests 8. The cumulative total of the areas that are spot treated will be about equal to coverage area 32. According to another embodiment, coverage area 32 is about 23.2 square meters (240 square feet or 0.0055 acres), 92.9 square meters (1,000 square feet or 0.023 acres), 278.7 square meters (3,000 square feet or 0.0689 acres) or any other area as shown in Table 1 below. According to alternative embodiments of the present disclosure, other coverage areas 32 may be provided, such as 0.1; 0.2; 0.3; 0.5; 0.75; 1.0; 1.25; 1.5; 2; 3; 4; 6; 7; 8; 9; 10; 12.5; 15; 17.5; 20; 25; 50; 100; 200; 300; 400; 500; 600; 750; 1,000; 2,000; 3,000; 4,000; 5,000; 7,500; and 10,000 square meters. Other coverage areas 32 smaller, larger, or in between these areas may also be provided.

According to the present embodiment, various ratios are provided for features of product 10. A ratio of total exterior surface area 44 of package 14 to coverage area 32 (the "ESA-to-CA ratio") is an example of one such ratio. According to one embodiment of the present disclosure, the ESA-to-CA ratio is 433 square centimeters/60 square feet (0.0014 acres) or about 314,285 square centimeters of package surface area per acre of coverage. According to other embodiments, other ESA-to-CA ratios for packages 14 may be provided, such as 100; 200; 500; 1,000; 5,000; 10,000; 17,500; 20,00; 22,500; 25,000; 30,000; 40,000; 50,000; 60,000; 70,000; 80,000; 90,000; 100,000; 125,000; 150,000; 200,000; 300,000; 400,000; 500,000; 750,000; 1,000,000 square centimeters of package surface area per acre of coverage. Other ESA-to-CA ratios that are smaller, larger, or in between these ratios may also be provided. Additional ESA-to-CA ratios are provided in Table 1 below based on an external surface area 44 of 433 square centimeters and the coverage area indicated in Table 1. The ESA-to-CA ratios for packages 14 may be altered by changing the amount of exterior surface area 44 and/or the amount of active ingredient 12 contained in package 14.

Depending on the selected predetermined coverage area 32, the pre-determined volume 28 of dilute mixture 30 may change. According to the (preferred embodiment of the present disclosure, 0.946.35 liters (one quart) of pre-determined volume 28 of dilute mixture 30 is sufficient for coverage area 32 of 5.57 square meters (60 square feet or 0.0014 acres) (i.e., 1 quart/60 square feet). As discussed above, coverage area 32 treated by active ingredient 12 may be different. As a result, pre-determined volume 28 of dilute mixture 30 may also change. For example, if coverage area 32 is 23.2 square meters (240 square feet or 0.0055 acres), pre-determined volume 28 of dilute mixture 30 may be 3.785 liters (four quarts). If coverage area 32 is 66.84 square meters (720 square feet or 0.0165 acres), pre-determined volume 28 of dilute mixture 30 may be 11.36 liters (twelve quarts).

According to another embodiment of the present disclosure, 0.946.35 liters (one quart) of pre-determined volume 28 of dilute mixture 30 is sufficient a coverage area 32 of 23.23 square meters (250 square feet or 0.0057 acres)(i.e. 1 quart/250 square feet). As discussed above, coverage area 32 treated by active ingredient 12 may be different. As a result, pre-determined volume 28 of dilute mixture 30 may also change. For example, if coverage area 32 is 92.9 square meters (1,000 square feet or 0.023 acres), pre-determined volume 28 of dilute mixture 30 may be 3.785 liters (four quarts). If coverage area 32 is 278.7 square meters (3,000 square feet or 0.0689 acres), pre-determined volume 28 of dilute mixture 30 may be 11.36 liters (twelve quarts). According to other alternative embodiments of the present disclosure, other ratios of pre-determined volume 28 to coverage area 32 may be provided, such as 0.1, 0.2, 0.3, 0.4, 0.5, 0.75, 1.25, 1.5, 1.75, 2, 3, 4, 5, 7.5, 10, 12.5, 15, 175, 20, 35, 50, 75, or 100 quarts per 100 square feet.

Figure 4:
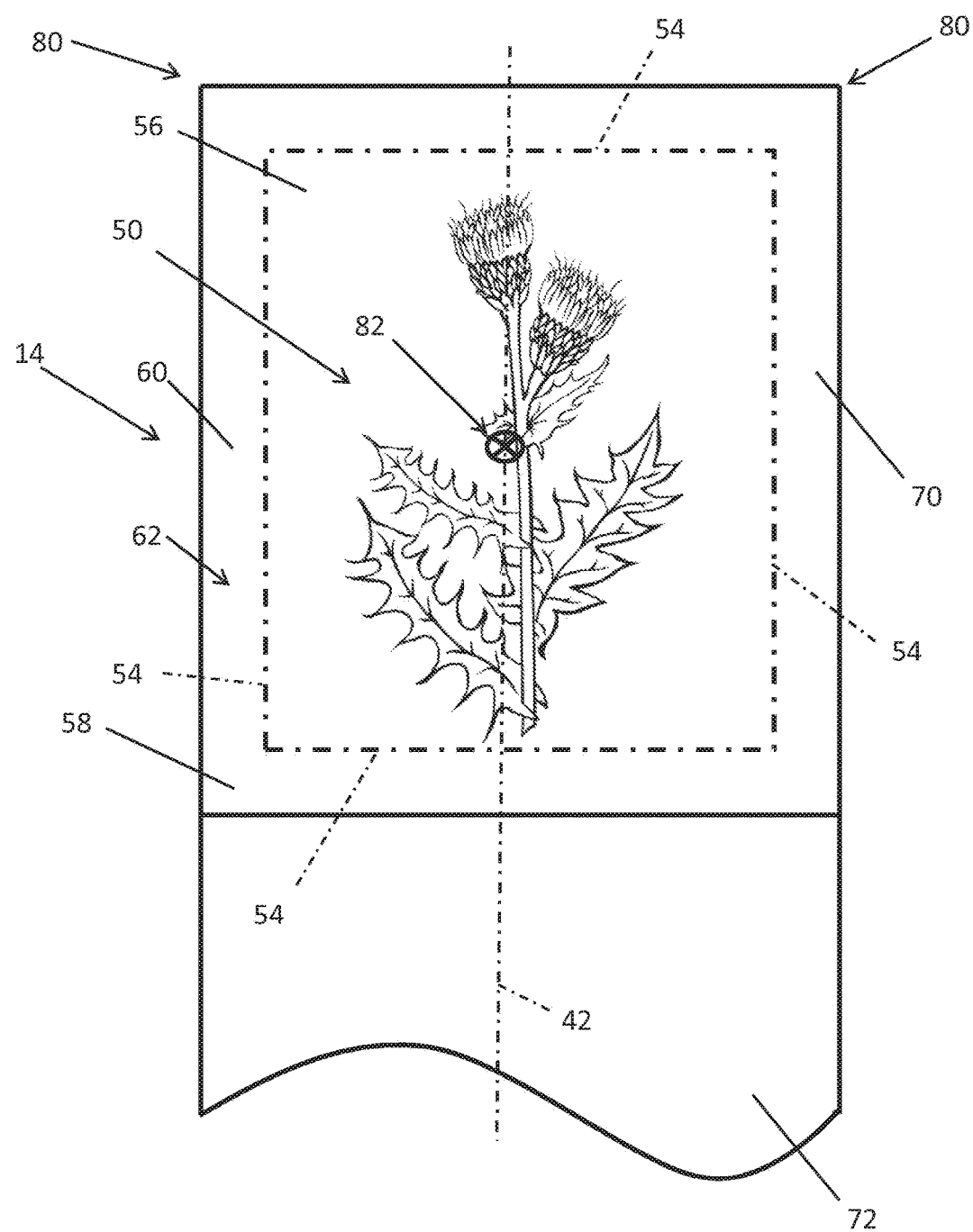
FIG. 4 is a top plan view of a portion of the package of FIG. 1 showing an upper portion of the package sealed along a path (shown in dashed lines) from a lower portion of the package so that the upper portion contains the agriculturally active ingredient.

As shown in FIGS. 4 and 5, package 14 includes one or more seals 54 that define interior region 20 and separate a storage portion 56 from a remainder portion 58 of package 14. Seals 54 are formed by adhering sheets 60 of foil 62 near interior region 20 together with adhesive; pressing together sheets 60 near interior region 20; applying heat to sheets 60 near interior region 20; or any other method of adhering sheets near interior region 20 together. One or more seals 54 may also be formed by folding foil 62 to define an edge in which case adhesion may not be necessary.

Storage portion 56 includes an interior surface area 66 defining a volume of interior region 20 and an exterior surface area 68 that are generally equal in size. Remainder portion 58 is generally defined by the portions of package 14 that do not define interior region 20. For example, remainder portion 58 includes edge portions 70 of sheets 60 that are adhered to form seals 54 and other portions 72 that are also spaced apart from interior region 20 that may or may not be adhered. Similar to storage portion 56, remainder portion 56 includes an exterior surface area 74 and an interior surface area 76 that are generally equal in size. Interior surface 76 is generally defined as the contact area between sheets 60. According to the preferred embodiment of the present disclosure, edge portions 70 are about 7 milimeters wide.

According to the preferred embodiment of the present disclosure, package 14 has a ratio of exterior surface area 68 of storage portion 56 to exterior surface area 74 of remainder portion 56 (the "ESASP-to-ESARP" ratio). According to the preferred embodiment, interior region is about 5.5 centimeters wide and 9 centimeters tong resulting in total exterior surface area 68 of storage portion of about 99 square centimeters. Because total exterior surface area 44 of package 14 is about 433 square centimeters, exterior surface area 74 of remainder portion 56 is about 334 square centimeters. Thus, the ESASP-to-ESARP ratio is 99 centimeters/334 centimeters or about 0.296. According to other embodiments, other ESASP-to-ESARP ratios for packages 14 may be provided, such as 0.01; 0.02; 0.05; 0.10; 0.20; 0.40; 0.50; 0.60; 0.70; 0.80; 0.90; 1.00; 1.25; 1.5; 2.0; 3.0; 5.0; 6.0; 7.0; 8.0; 9.0; 10.0; 12.5, and 15.0. Other ESASP-to-ESARP ratios that are smaller, larger, or in between these ratios may also be provided. The ESASP-to-ESARP ratios for packages 14 may change with either or both of the size or shape of storage portion 56 and remainder portion 56 of package 14.

According to the preferred embodiment of the present disclosure, package 14 has a ratio of total exterior surface area 44 of package 14 to interior surface area 66 (the "ESA-to-ISA" ratio). According to the preferred embodiment, interior surface area 66 is substantially the same size as total exterior surface area 68 of storage portion 56 of about 99 square centimeters. As mentioned above, total exterior surface area 44 of package 14 is about 433 square centimeters. Thus, the ESA-to-ISA ratio is 433 centimeters/ 99 centimeters or about 4.37. According to other embodiments, other ESA-to-ISA ratios for packages 14 may be provided, such as 0.01; 0.02; 0.05; 0.10; 0.20; 0.40; 0.50; 0.60; 0.70; 0.80; 0.90; 1.00; 1.25; 1.5; 1.75; 2.0; 3.0; 5.0; 6.0; 7.0; 8.0; 9.0; 10.0; 12.5, 15.0; 25.0; 50.0; 75.0; 100; 200; 400; 600; 800; and 1,000. Other ESA-to-ISA ratios that are smaller, larger, or in between these ratios may also be provided. The ESA-to-ISA ratios for packages 14 may change with either or both of the size or shape of package 14 and storage portion 56.

According to the preferred embodiment of the present disclosure, package 14 has a ratio of total interior surface area 66 of package 14 to coverage area 32 (the "ISA-to-CA ratio"). According to one embodiment of the present disclosure, the ISA-to-CA ratio is 99 square centimeters/60 square feet or about 71,874 square centimeters of interior package surface area per acre of coverage. According to other embodiments, other ISA-to-CA ratios for packages 14 may be provided, such as 100; 200; 500; 1,000; 5,000; 10,000; 17,500; 20,000; 22,500; 25,000; 30,000; 40,000; 50,000; 60,000; 70,000; 80,000; 90,000; 100,000; 125,000, and 150,000 square centimeters of interior package surface area per acre of coverage. Other ISA-to-CA ratios that are smaller, larger, or in between these ratios may also be provided. Additional ISA-to-CA ratios are provided in Table 1 below. The ISA-to-CA ratios for packages 14 may be altered by changing the amount of interior surface area 66 and/or the amount of active ingredient 12 contained in package 14.

Figure 3:
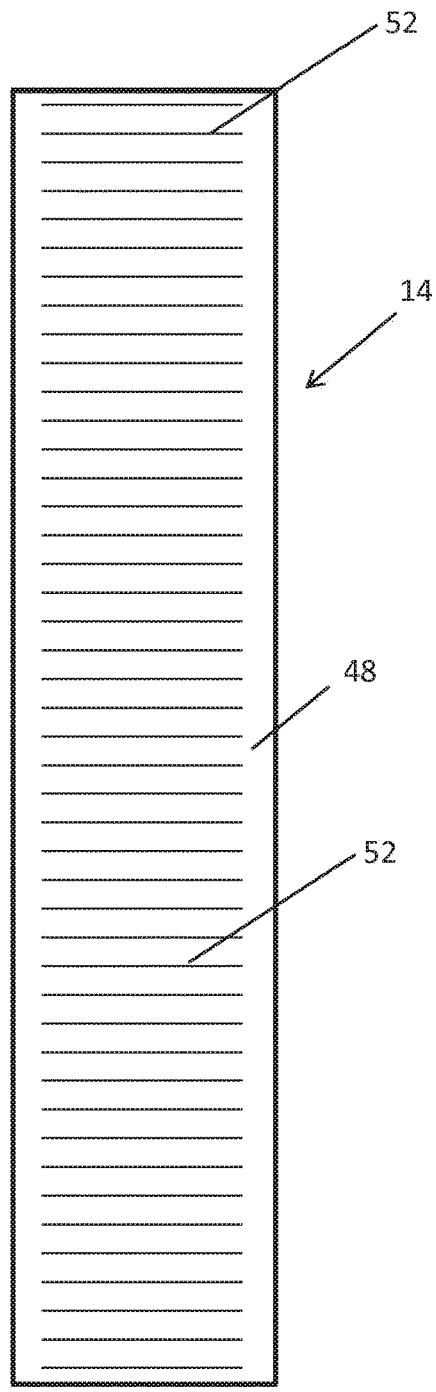
FIG. 3 is a bottom plan view of the agriculturally active product of FIG. 1.

As shown in FIG. 2, package 14 includes a package centroid 78. Corners 80 of package 14 are positioned farthest from centroid 78 by a farthest distance 86. As shown in FIGS. 3, 4, and 5, interior region 20 includes an interior region centroid 82. As shown in FIG. 2, package centroid 78 is spaced apart from interior region centroid 82 by an offset distance 84. According to the preferred embodiment of the present disclosure, offset distance 84 is 11.45 centimeters and farthest distance 86 is 16.96 centimeters, resulting in a ratio of offset distance to farthest distance of 0.675. According to other embodiments, other offset to farthest distance ratios for packages 14 may be provided, such as 0.01; 0.02; 0.05; 0.10; 0.20; 0.40; 0.50; 0.60; 0.70; 0.80; 0.90; 1.00; 1.25; 1.5; 2.0; 3.0; 5.0; 6.0; 7.0; 8.0; 9.0; 10.0; 12.5, and 15.0. Other such ratios that are smaller, larger, or in between these ratios may also be provided. Such ratios for packages 14 may change with either or both of the size of packages 14 and/or the location of interior region centroid 82.

The weight and volume of material 16 necessary to satisfy the dosage rate for coverage area 32 varies with the size of coverage area 32, the specific type of active ingredient, and the amount of inert ingredient 18 provided in material 16. For example, package 14 may include different types of herbicides, insecticides, fungicides, etc. such as those listed in Table 1 or another type of pest control ingredient and/or plant growth regulators as an active ingredient 12. As used herein, the term active ingredient encompasses the active ingredient or the acid equivalent of the active ingredient (i.e., the acid portion of the active ingredient) as delineated in Table 1 with an asterisk (*).

TABLE 1

| Ex. No. | Common name | brand name | type | dilute mix size (l) | vol. of mat. (VOM) (ml) | wt. of mat. (WOM) (g) |
|---|---|---|---|---|---|---|
| 1 | florasulam | Frontline | herbicide | 0.95 | 0.698 | 0.722 |
| 2 | 2,4, dichlorophenol and MCPP acid* | Trimec classic | herbicide | 0.95 | 10.861 | 12.187 |
| 3 | clopyralid MEA salt* | Lontrel | herbicide | 0.95 | 1.792 | 2.081 |
| 4 | myclobutanil | Eagle 20 E W | herbicide | 0.95 | 8.825 | 9.099 |
| 5 | penoxsulam | Grasp SC | fungicide | 0.95 | 0.679 | 0.754 |
| 6 | triclopyr-2-butoxyethyl ester* | Turflon Ester | herbicide | 0.95 | 5.431 | 5.865 |
| 7 | glyphosate* | Durango | herbicide | 0.95 | 16.292 | 19.697 |
| 8 | 4-amino-3-chloro-6-(4-chloro-2-fluoro-3-methoxyphenyl)pyridine-2-carboxylic acid methyl ester* | | herbicide | 0.95 | 0.242 | 0.244 |
| 9 | florasulam | Frontline | herbicide | 3.79 | 2.792 | 2.887 |
| 10 | 2,4, dichlorophenol and MCPP acid* | Trimec classic | herbicide | 3.79 | 43.446 | 48.746 |
| 11 | clopyralid MEA salt* | Lontrel | herbicide | 3.79 | 7.169 | 8.323 |
| 12 | myclobutanil | Eagle 20 E W | herbicide | 3.79 | 35.300 | 36.394 |
| 13 | penoxsulam | Grasp SC | fungicide | 3.79 | 2.715 | 3.014 |
| 14 | triclopyr-2-butoxyethyl ester* | Turflon Ester | herbicide | 3.79 | 21.723 | 23.461 |
| 15 | glyphosate* | Durango | herbicide | 3.79 | 65.169 | 78.789 |
| 16 | 4-amino-3-chloro-6-(4-chloro-2-fluoro-3-methoxyphenyl)pyridine-2-carboxylic acid methyl ester* | | herbicide | 3.79 | 0.967 | 0.976 |
| 17 | florasulam | Frontline | herbicide | 11.36 | 8.377 | 8.661 |
| 18 | 2,4, dichlorophenol and MCPP acid* | Trimec classic | herbicide | 11.36 | 130.337 | 146.239 |
| 19 | clopyralid MEA salt* | Lontrel | herbicide | 11.36 | 21.506 | 24.968 |
| 20 | myclobutanil | Eagle 20 E W | herbicide | 11.36 | 105.899 | 109.182 |
| 21 | penoxsulam | Grasp SC | fungicide | 11.36 | 8.146 | 9.042 |
| 22 | triclopyr-2-butoxyethyl ester* | Turflon Ester | herbicide | 11.36 | 65.169 | 70.382 |
| 23 | glyphosate | Durango | herbicide | 11.36 | 195.506 | 236.367 |
| 24 | 4-amino-3-chloro-6-(4-chloro-2-fluoro-3-methoxyphenyl)pyridine-2-carboxylic acid methyl ester* | | herbicide | 11.36 | 2.900 | 2.929 |
| 25 | spinetoram with sulfoxaflor | | insecticide | 0.95 | 0.071 | 0.068 |
| 26 | spinetoram with sulfoxaflor | | insecticide | 0.95 | 0.143 | 0.137 |
| 27 | sulfoxaflor | Transform | insecticide | 0.95 | 0.122 | 0.051 |
| 28 | sulfoxaflor | Transform | insecticide | 0.95 | 0.244 | 0.103 |
| 29 | acephate | Orthene WSG | insecticide | 0.95 | 0.975 | 0.469 |
| 30 | imidacloprid | Marathon II | insecticide | 0.95 | 0.138 | 0.155 |
| 31 | myclobutanil | Eagle 20 E W | herbicide | 0.95 | 0.815 | 0.840 |
| 32 | myclobutanil | Eagle 20 E W | herbicide | 0.95 | 0.815 | 0.840 |
| 33 | spinetoram with sulfoxaflor | | insecticide | 0.95 | 0.285 | 0.274 |
| 34 | spinetoram with sulfoxaflor | | insecticide | 0.95 | 0.407 | 0.391 |
| 35 | spinetoram with sulfoxaflor | | insecticide | 0.95 | 0.570 | 0.547 |
| 36 | sulfoxaflor | Transform | insecticide | 0.95 | 0.652 | 0.274 |
| 37 | spinetoram J & L | Radiant | insecticide | 0.95 | 0.244 | 0.251 |
| 38 | spinetoram J & L | Radiant | insecticide | 0.95 | 0.652 | 0.668 |
| 39 | spinosad A & D | Conserve | insecticide | 0.95 | 1.792 | 1.893 |
| 40 | spinetoram with sulfoxaflor | | insecticide | 3.79 | 0.285 | 0.273 |
| 41 | spinetoram with sulfoxaflor | | insecticide | 3.79 | 0.570 | 0.546 |
| 42 | sulfoxaflor | Transform | insecticide | 3.79 | 0.489 | 0.205 |
| 43 | sulfoxaflor | Transform | insecticide | 3.79 | 0.978 | 0.411 |
| 44 | acephate | Orthene WSG | insecticide | 3.79 | 3.901 | 1.875 |
| 45 | imidacloprid | Marathon II | insecticide | 3.79 | 0.554 | 0.620 |
| 46 | myclobutanil | Eagle 20 E W | herbicide | 3.79 | 3.259 | 3.360 |
| 47 | myclobutanil | Eagle 20 E W | herbicide | 3.79 | 3.259 | 3.360 |
| 48 | spinetoram with sulfoxaflor | | insecticide | 3.79 | 1.141 | 1.095 |
| 49 | spinetoram with sulfoxaflor | | insecticide | 3.79 | 1.629 | 1.564 |
| 50 | spinetoram with sulfoxaflor | | insecticide | 3.79 | 2.281 | 2.190 |
| 51 | sulfoxaflor | Transform | insecticide | 3.79 | 2.607 | 1.095 |
| 52 | spinetoram J & L | Radiant | insecticide | 3.79 | 0.978 | 1.002 |
| 53 | spinetoram J & L | Radiant | insecticide | 3.79 | 2.607 | 2.672 |

TABLE 1-continued

| | | | | | | |
|---|---|---|---|---|---|---|
| 54 | spinosad A & D | Conserve | insecticide | 3.79 | 7.169 | 7.571 |
| 55 | spinetoram with sulfoxaflor | | insecticide | 11.36 | 0.855 | 0.820 |
| 56 | spinetoram with sulfoxaflor | | insecticide | 11.36 | 1.711 | 1.639 |
| 57 | sulfoxaflor | Transform | insecticide | 11.36 | 1.466 | 0.616 |
| 58 | sulfoxaflor | Transform | insecticide | 11.36 | 2.933 | 1.232 |
| 59 | acephate | Orthene WSG | insecticide | 11.36 | 11.703 | 5.624 |
| 60 | imidacloprid | Marathon II | insecticide | 11.36 | 1.662 | 1.861 |
| 61 | myclobutanil | Eagle 20 E W | herbicide | 11.36 | 9.776 | 10.079 |
| 62 | myclobutanil | Eagle 20 E W | herbicide | 11.36 | 9.776 | 10.079 |
| 63 | spinetoram with sulfoxaflor | | insecticide | 11.36 | 3.422 | 3.285 |
| 64 | spinetoram with sulfoxaflor | | insecticide | 11.36 | 4.888 | 4.692 |
| 65 | spinetoram with sulfoxaflor | | insecticide | 11.36 | 6.843 | 6.569 |
| 66 | sulfoxaflor | Transform | insecticide | 11.36 | 7.821 | 3.285 |
| 67 | spinetoram J & L | Radiant | insecticide | 11.36 | 2.933 | 3.006 |
| 68 | spinetoram J & L | Radiant | insecticide | 11.36 | 7.821 | 8.017 |
| 69 | spinosad A & D | Conserve | insecticide | 11.36 | 21.508 | 22.712 |

| Ex. No. | Common name | vol. of act. ingr. (VAI)(ml) | wt. of act. ingr. (WAI)(g) | coverage area (acres) | ESA-CA ratio ($cm^2$/acre) | ISA-CA ratio ($cm^2$/acre) |
|---|---|---|---|---|---|---|
| 1 | florasulam | 0.0225 | 0.0349 | 0.0057 | 75,428 | 17,250 |
| 2 | 2,4, dichlorophenol and MCPP acid* | 4.4709 | 3.5365 | 0.0057 | 75,428 | 17,250 |
| 3 | clopyralid MEA salt* | 2.1742 | 0.6443 | 0.0057 | 75,428 | 17,250 |
| 4 | myclobutanil | 2.2092 | 1.7661 | 0.0057 | 75,428 | 17,250 |
| 5 | penoxsulam | 0.2662 | 0.1627 | 0.0057 | 75,428 | 17,250 |
| 6 | triclopyr-2-butoxyethyl ester* | 1.9929 | 2.6032 | 0.0057 | 75,428 | 17,250 |
| 7 | glyphosate* | 10.3200 | 5.7792 | 0.0057 | 75,428 | 17,250 |
| 8 | 4-amino-3-chloro-6-(4-chloro-2-fluoro-3-methoxyphenyl)pyridine-2-carboxylic acid methyl ester* | 0.1363 | 0.0232 | 0.0057 | 75,428 | 17,250 |
| 9 | florasulam | 0.0900 | 0.1395 | 0.0230 | 18,857 | 4,312 |
| 10 | 2,4, dichlorophenol and MCPP acid* | 12.8903 | 14.1461 | 0.0230 | 18,857 | 4,312 |
| 11 | clopyralid MEA salt* | 8.6968 | 2.5772 | 0.0230 | 18,857 | 4,312 |
| 12 | myclobutanil | 5.7906 | 7.0646 | 0.0230 | 18,857 | 4,312 |
| 13 | penoxsulam | 1.0648 | 0.6508 | 0.0230 | 18,857 | 4,312 |
| 14 | triclopyr-2-butoxyethyl ester* | 7.9717 | 10.4130 | 0.0230 | 18,857 | 4,312 |
| 15 | glyphosate* | 41.2801 | 23.1168 | 0.0230 | 18,857 | 4,312 |
| 16 | 4-amino-3-chloro-6-(4-chloro-2-fluoro-3-methoxyphenyl)pyridine-2-carboxylic acid methyl ester* | 0.5452 | 0.0927 | 0.0230 | 18,857 | 4,312 |
| 17 | florasulam | 0.2701 | 0.4186 | 0.0689 | 6,286 | 1,437 |
| 18 | 2,4, dichlorophenol and MCPP acid* | 36.0599 | 42.4382 | 0.0689 | 6,286 | 1,437 |
| 19 | clopyralid MEA salt* | 26.0904 | 7.7316 | 0.0689 | 6,286 | 1,437 |
| 20 | myclobutanil | 17.3719 | 21.1937 | 0.0689 | 6,286 | 1,437 |
| 21 | penoxsulam | 3.1945 | 1.9524 | 0.0689 | 6,286 | 1,437 |
| 22 | triclopyr-2-butoxyethyl ester* | 23.9151 | 31.2390 | 0.0689 | 6,286 | 1,437 |
| 23 | glyphosate | 123.8402 | 69.3505 | 0.0689 | 6,286 | 1,437 |
| 24 | 4-amino-3-chloro-6-(4-chloro-2-fluoro-3-methoxyphenyl)pyridine-2-carboxylic acid methyl ester* | 1.6355 | 0.2780 | 0.0689 | 6,286 | 1,437 |
| 25 | spinetoram with sulfoxaflor | 0.0375 | 0.0273 | 0.0014 | 314,285 | 71,874 |
| 26 | spinetoram with sulfoxaflor | 0.0749 | 0.0546 | 0.0014 | 314,285 | 71,874 |
| 27 | sulfoxaflor | 0.0474 | 0.0147 | 0.0014 | 314,285 | 71,874 |
| 28 | sulfoxaflor | 0.0945 | 0.0293 | 0.0014 | 314,285 | 71,874 |
| 29 | acephate | 0.9460 | 0.4546 | 0.0014 | 314,285 | 71,874 |
| 30 | imidacloprid | 0.0691 | 0.0332 | 0.0014 | 314,285 | 71,874 |
| 31 | myclobutanil | 0.1445 | 0.1630 | 0.0014 | 314,285 | 71,874 |
| 32 | myclobutanil | 0.1445 | 0.1630 | 0.0014 | 314,285 | 71,874 |
| 33 | spinetoram with sulfoxaflor | 0.1501 | 0.1095 | 0.0014 | 314,285 | 71,874 |
| 34 | spinetoram with sulfoxaflor | 0.2145 | 0.1564 | 0.0014 | 314,285 | 71,874 |
| 35 | spinetoram with sulfoxaflor | 0.3003 | 0.2190 | 0.0014 | 314,285 | 71,874 |
| 36 | sulfoxaflor | 0.2523 | 0.0782 | 0.0014 | 314,285 | 71,874 |
| 37 | spinetoram J & L | 0.0255 | 0.0293 | 0.0014 | 314,285 | 71,874 |
| 38 | spinetoram J & L | 0.0680 | 0.0781 | 0.0014 | 314,285 | 71,874 |
| 39 | spinosad A & D | 0.1810 | 0.2148 | 0.0014 | 314,285 | 71,874 |
| 40 | spinetoram with sulfoxaflor | 0.1498 | 0.1093 | 0.0055 | 78,571 | 17,969 |
| 41 | spinetoram with sulfoxaflor | 0.2997 | 0.2185 | 0.0055 | 78,571 | 17,969 |
| 42 | sulfoxaflor | 0.1897 | 0.0588 | 0.0055 | 78,571 | 17,969 |
| 43 | sulfoxaflor | 0.3781 | 0.1172 | 0.0055 | 78,571 | 17,969 |
| 44 | acephate | 3.7841 | 1.8185 | 0.0055 | 78,571 | 17,969 |
| 45 | imidacloprid | 0.2763 | 0.1328 | 0.0055 | 78,571 | 17,969 |
| 46 | myclobutanil | 0.5780 | 0.6522 | 0.0055 | 78,571 | 17,969 |
| 47 | myclobutanil | 0.5780 | 0.6522 | 0.0055 | 78,571 | 17,969 |
| 48 | spinetoram with sulfoxaflor | 0.6005 | 0.4379 | 0.0055 | 78,571 | 17,969 |
| 49 | spinetoram with sulfoxaflor | 0.8579 | 0.6256 | 0.0055 | 78,571 | 17,969 |
| 50 | spinetoram with sulfoxaflor | 1.2011 | 0.8759 | 0.0055 | 78,571 | 17,969 |
| 51 | sulfoxaflor | 1.0091 | 0.3128 | 0.0055 | 78,571 | 17,969 |
| 52 | spinetoram J & L | 0.1020 | 0.1172 | 0.0055 | 78,571 | 17,969 |
| 53 | spinetoram J & L | 0.2720 | 0.3124 | 0.0055 | 78,571 | 17,969 |

TABLE 1-continued

| | | | | | | |
|---|---|---|---|---|---|---|
| 54 | spinosad A & D | 0.7241 | 0.8592 | 0.0055 | 78,571 | 17,969 |
| 55 | spinetoram with sulfoxaflor | 0.4495 | 0.3278 | 0.0165 | 26,190 | 5,990 |
| 56 | spinetoram with sulfoxaflor | 0.8991 | 0.6556 | 0.0165 | 26,190 | 5,990 |
| 57 | sulfoxaflor | 0.5691 | 0.1764 | 0.0165 | 26,190 | 5,990 |
| 58 | sulfoxaflor | 1.1342 | 0.3516 | 0.0165 | 26,190 | 5,990 |
| 59 | acephate | 11.3524 | 5.4554 | 0.0165 | 26,190 | 5,990 |
| 60 | imidacloprid | 0.8289 | 0.3983 | 0.0165 | 26,190 | 5,990 |
| 61 | myclobutanil | 1.7340 | 1.9566 | 0.0165 | 26,190 | 5,990 |
| 62 | myclobutanil | 1.7340 | 1.9566 | 0.0165 | 26,190 | 5,990 |
| 63 | spinetoram with sulfoxaflor | 1.8016 | 1.3138 | 0.0165 | 26,190 | 5,990 |
| 64 | spinetoram with sulfoxaflor | 2.5737 | 1.8769 | 0.0165 | 26,190 | 5,990 |
| 65 | spinetoram with sulfoxaflor | 3.6032 | 2.6276 | 0.0165 | 26,190 | 5,990 |
| 66 | sulfoxaflor | 3.0272 | 0.9384 | 0.0165 | 26,190 | 5,990 |
| 67 | spinetoram J & L | 0.3060 | 0.3515 | 0.0165 | 26,190 | 5,990 |
| 68 | spinetoram J & L | 0.8161 | 0.9373 | 0.0165 | 26,190 | 5,990 |
| 69 | spinosad A & D | 2.1722 | 2.5775 | 0.0165 | 26,190 | 5,990 |

| Ex. No. | Common name | ESA-VOM ratio ($cm^2$/ml) | ESARP-VOM ratio (cm/ml) | ESA-WOM ratio ($cm^2$/g) | ESA-VAI ratio ($cm^2$/ml) | ESA-WAI ratio (cm/g) |
|---|---|---|---|---|---|---|
| 1 | florasulam | 620.16 | 478.33 | 599.76 | 19,235.3 | 12,409.87 |
| 2 | 2,4, dichlorophenol and MCPP acid* | 39.86 | 30.74 | 35.52 | 96.8 | 122.41 |
| 3 | clopyralid MEA salt* | 241.55 | 186.31 | 208.06 | 199.1 | 671.89 |
| 4 | myclobutanil | 49.05 | 37.84 | 47.58 | 196.0 | 245.11 |
| 5 | penoxsulam | 637.70 | 491.87 | 574.51 | 1,626.1 | 2,660.68 |
| 6 | triclopyr-2-butoxyethyl ester* | 79.71 | 61.48 | 73.81 | 217.2 | 166.29 |
| 7 | glyphosate* | 26.57 | 20.49 | 21.98 | 41.9 | 74.91 |
| 8 | 4-amino-3-chloro-6-(4-chloro-2-fluoro-3-methoxyphenyl)pyridine-2-carboxylic acid methyl ester* | 1,791.31 | 1,381.65 | 1,773.57 | 3,176.4 | 18,684.52 |
| 9 | florasulam | 155.04 | 119.58 | 149.94 | 4,808.8 | 3,102.47 |
| 10 | 2,4, dichlorophenol and MCPP acid* | 9.96 | 7.69 | 8.88 | 33.6 | 30.60 |
| 11 | clopyralid MEA salt* | 60.39 | 46.58 | 52.01 | 49.8 | 167.97 |
| 12 | myclobutanil | 12.26 | 9.46 | 11.89 | 74.8 | 61.28 |
| 13 | penoxsulam | 159.43 | 122.97 | 143.63 | 406.5 | 665.17 |
| 14 | triclopyr-2-butoxyethyl ester* | 19.93 | 15.37 | 18.45 | 54.3 | 41.57 |
| 15 | glyphosate* | 6.64 | 5.12 | 5.49 | 10.5 | 18.73 |
| 16 | 4-amino-3-chloro-6-(4-chloro-2-fluoro-3-methoxyphenyl)pyridine-2-carboxylic acid methyl ester* | 447.83 | 345.41 | 443.39 | 794.1 | 4,671.13 |
| 17 | florasulam | 51.68 | 39.86 | 49.98 | 1,602.9 | 1,034.16 |
| 18 | 2,4, dichlorophenol and MCPP acid* | 3.32 | 2.56 | 2.96 | 12.0 | 10.20 |
| 19 | clopyralid MEA salt* | 20.13 | 15.53 | 17.34 | 16.6 | 55.99 |
| 20 | myclobutanil | 4.09 | 3.15 | 3.96 | 24.9 | 20.43 |
| 21 | penoxsulam | 53.14 | 40.99 | 47.88 | 135.5 | 221.72 |
| 22 | triclopyr-2-butoxyethyl ester* | 6.64 | 5.12 | 6.15 | 18.1 | 13.86 |
| 23 | glyphosate | 2.21 | 1.71 | 1.83 | 3.5 | 6.24 |
| 24 | 4-amino-3-chloro-6-(4-chloro-2-fluoro-3-methoxyphenyl)pyridine-2-carboxylic acid methyl ester* | 149.28 | 115.14 | 147.80 | 264.7 | 1,557.04 |
| 25 | spinetoram with sulfoxaflor | 6,072.72 | 4,683.95 | 6,338.51 | 11,555.9 | 15,846.27 |
| 26 | spinetoram with sulfoxaflor | 3,036.36 | 2,341.97 | 3,169.25 | 5,777.9 | 7,923.13 |
| 27 | sulfoxaflor | 3,542.42 | 2,732.30 | 8,434.33 | 9,127.9 | 29,444.84 |
| 28 | sulfoxaflor | 1,771.21 | 1,366.15 | 4,217.16 | 4,580.2 | 14,774.81 |
| 29 | acephate | 443.87 | 342.36 | 923.66 | 457.6 | 952.23 |
| 30 | imidacloprid | 3,125.66 | 2,410.85 | 2,790.77 | 6,266.9 | 13,041.11 |
| 31 | myclobutanil | 531.36 | 409.85 | 515.39 | 2,995.8 | 2,655.08 |
| 32 | myclobutanil | 531.36 | 409.85 | 515.39 | 2,995.8 | 2,655.08 |
| 33 | spinetoram with sulfoxaflor | 1,518.18 | 1,170.99 | 1,581.61 | 2,883.5 | 3,954.02 |
| 34 | spinetoram with sulfoxaflor | 1,062.73 | 819.69 | 1,107.13 | 2,018.4 | 2,767.82 |
| 35 | spinetoram with sulfoxaflor | 759.09 | 585.49 | 790.80 | 1,441.7 | 1,977.01 |
| 36 | sulfoxaflor | 664.20 | 512.31 | 1,581.44 | 1,716.0 | 5,535.63 |
| 37 | spinetoram J & L | 1,771.21 | 1,366.15 | 1,728.01 | 16,974.7 | 14,779.92 |
| 38 | spinetoram J & L | 664.20 | 512.31 | 648.00 | 6,365.5 | 5,542.47 |
| 39 | spinosad A & D | 241.53 | 186.29 | 228.72 | 2,391.5 | 2,015.44 |
| 40 | spinetoram with sulfoxaflor | 1,518.18 | 1,170.99 | 1,584.63 | 2,889.0 | 3,961.57 |
| 41 | spinetoram with sulfoxaflor | 759.09 | 585.49 | 792.31 | 1,444.5 | 1,980.78 |
| 42 | sulfoxaflor | 885.60 | 683.08 | 2,108.58 | 2,282.0 | 7,361.21 |
| 43 | sulfoxaflor | 442.80 | 341.54 | 1,054.29 | 1,145.0 | 3,693.70 |
| 44 | acephate | 110.97 | 85.59 | 230.92 | 114.4 | 238.06 |
| 45 | imidacloprid | 781.42 | 602.71 | 697.69 | 1,566.7 | 3,260.28 |
| 46 | myclobutanil | 132.84 | 102.46 | 128.85 | 749.0 | 663.77 |
| 47 | myclobutanil | 132.84 | 102.46 | 128.85 | 749.0 | 663.77 |
| 48 | spinetoram with sulfoxaflor | 379.54 | 292.75 | 395.40 | 720.9 | 988.51 |
| 49 | spinetoram with sulfoxaflor | 265.68 | 204.92 | 276.78 | 504.6 | 691.95 |
| 50 | spinetoram with sulfoxaflor | 189.77 | 146.37 | 197.70 | 360.4 | 494.25 |
| 51 | sulfoxaflor | 166.05 | 128.08 | 395.36 | 429.0 | 1,383.91 |
| 52 | spinetoram J & L | 442.80 | 341.54 | 432.00 | 4,243.7 | 3,694.98 |
| 53 | spinetoram J & L | 166.05 | 128.08 | 162.00 | 1,591.4 | 1,385.62 |

TABLE 1-continued

| 54 | spinosad A & D | 60.38 | 46.57 | 57.18 | 597.9 | 503.86 |
| 55 | spinetoram with sulfoxaflor | 506.06 | 390.33 | 528.21 | 963.0 | 1,320.52 |
| 56 | spinetoram with sulfoxaflor | 253.03 | 195.16 | 264.10 | 481.5 | 660.26 |
| 57 | sulfoxaflor | 295.20 | 227.69 | 702.86 | 760.7 | 2,453.74 |
| 58 | sulfoxaflor | 147.60 | 113.85 | 351.43 | 381.7 | 1,231.23 |
| 59 | acephate | 36.99 | 28.53 | 76.97 | 38.1 | 79.35 |
| 60 | imidacloprid | 260.47 | 200.90 | 232.56 | 522.2 | 1,086.76 |
| 61 | myclobutanil | 44.28 | 34.15 | 42.95 | 249.7 | 221.26 |
| 62 | myclobutanil | 44.28 | 34.15 | 42.95 | 249.7 | 221.26 |
| 63 | spinetoram with sulfoxaflor | 126.51 | 97.58 | 131.80 | 240.3 | 329.50 |
| 64 | spinetoram with sulfoxaflor | 88.56 | 68.31 | 92.26 | 168.2 | 230.65 |
| 65 | spinetoram with sulfoxaflor | 63.26 | 48.79 | 65.90 | 120.1 | 164.75 |
| 66 | sulfoxaflor | 55.35 | 42.69 | 131.79 | 143.0 | 461.30 |
| 67 | spinetoram J & L | 147.60 | 113.85 | 144.00 | 1,414.6 | 1,231.66 |
| 68 | spinetoram J & L | 55.35 | 42.69 | 54.00 | 530.5 | 461.87 |
| 69 | spinosad A & D | 20.13 | 15.52 | 19.06 | 199.3 | 167.95 |

Each active ingredient 12 has a required weight or volume required to provide an effect amount of active ingredient 12 for a given coverage area 32. As mentioned above, material 16 typically includes both active ingredient(s) 12 and inert ingredient(s) 18. The amount of inert ingredient 18 provided in material 16 will determine the concentration of active ingredient 12 in material 16. This concentration will determine the weight or volume of material 16 required in package 14 for the predetermined coverage area 32. Based on the amount of material 16 contained in package 14, various ratios for features of product 10 can be determined.

According to the preferred embodiment of the present disclosure, package 14 has a ratio of total exterior surface area 44 to volume of material stored in interior region 20 (the "ESA-to-VOM" ratio). As discussed above, exterior surface area 44 of the preferred embodiment is about 433 square centimeters. As shown in Table 1, the volume of material stored in interior region 20 may range from 0.071 milliliters to 195.5 milliliters resulting in a ESA-to-VOM ratio ranging from 2.21 to 6.073 square centimeters/milliliter. According to other embodiments, other ESA-to-VOM ratios for packages 14 may be provided, such as 0.1; 0.2; 0.5; 1.0; 2.0; 4.0; 5.0; 6.0; 7.0; 8.0; 9.0; 10; 12.5; 15; 20; 30; 50; 60; 70; 80; 90; 100; 125, 250; 500; 1,000; 2,000; 3,000; 4,000; 5,000; 7,500; 10,000; and 15,000 square centimeters/milliliter. Other ESA-to-VOM ratios that are smaller, larger, or in between these ratios may also be provided. The ESA-to-VOM ratios for packages 14 may be changed with either or both of the size or shape of package 14 and the volume of material stored in interior region 20.

According to the preferred embodiment of the present disclosure, package 14 has a ratio of exterior surface area 68 of storage portion 56 to volume of material stored in interior region 20 (the "ESARP-to-VOM" ratio). As discussed above, exterior surface area 68 of storage portion 56 of the preferred embodiment is about 334 square centimeters. As shown in Table 1, the volume of material stored in interior region 20 may range from 0.071 milliliters to 195.5 milliliters resulting in an ESARP-to-VOM ratio ranging from 1.71 to 4,684 square centimeters/milliliter. According to other embodiments, other ESARP-to-VOM ratios for packages 14 may be provided, such as 0.1; 0.2; 0.5; 1.0; 2.0; 4.0; 5.0; 6.0; 7.0; 8.0; 9.0; 10; 12.5; 15; 20; 30; 50; 60; 70; 80; 90; 100; 125, 250; 500; 1,000; 2,000; 3,000; 4,000; 5,000; 7,500; 10,000; and 15,000 square centimeters/milliliter. Other ESARP-to-VOM ratios that are smaller, larger, or in between these ratios may also be provided. The ESARP-to-VOM ratios for packages 14 may be changed with either or both of the size or shape of package 14 and the volume of material stored in interior region 20.

According to the preferred embodiment of the present disclosure, package 14 has a ratio of total exterior surface area 44 to weight of material stored in interior region 20 (the "ESA-to-WOM" ratio). As discussed above, exterior surface area 44 of the preferred embodiment is about 433 square centimeters. As shown in Table 1, the weight of material stored in interior region 20 may range from 0.05 grams to 236 grams resulting in a ESA-to-WOM ratio ranging from 1.83 to 8,434 square centimeters/gram. According to other embodiments, other ESA-to-VOM ratios for packages 14 may be provided, such as 0.01; 0.02; 0.03; 0.05, 0.075; 0.1; 0.2; 0.5; 1.0; 2.0; 4.0; 5.0; 6.0; 7.0; 8.0; 9.0; 10; 12.5; 15; 20; 30; 50; 60; 70; 80; 90; 100; 125, 250; 500; 1,000; 2,000, 3,000; 4,000; 5,000; 7,500; 10,000; and 15,000 centimeters/gram. Other ESA-to-WOM ratios that are smaller, larger, or in between these ratios may also be provided. The ESA-to-WOM ratios for packages 14 may be changed with either or both of the size or shape of package 14 and the weight of material stored in interior region 20.

According to the preferred embodiment of the present disclosure, package 14 has a ratio of total exterior surface area 44 to volume of active ingredient stored in interior region 20 (the "ESA-to-VAI" ratio). As discussed above, exterior surface area 44 of the preferred embodiment is about 433 square centimeters. As shown in Table 1, the volume of active ingredient stored in interior region 20 may range from 0.0225 to 123.8 milliliters resulting in a ESA-to-VAI ratio ranging from 3.50 to 19,235 square centimeters/milliliter. Typically, the volume of active ingredient is dependent upon the bulk density of the active ingredient added to the water or other solution that constitutes the volume of material contained in interior region 20. According to other embodiments, other ESA-to-VAI ratios for packages 14 may be provided, such as 0.1; 0.2; 0.5; 1.0; 2.0; 4.0; 5.0; 6.0; 7.0; 8.0; 9.0; 10; 12.5; 15; 20; 30; 50; 60; 70; 80; 90; 100; 125, 250; 500; 1,000; 2,000; 3,000; 4,000; 5,000; 7,500; 10,000; 15,000; 20,000; 30,000; 40,000; 60,000; 80,000; and 100,000 square centimeters/milliliter. Other ESA-to-VAI ratios that are smaller, larger, or in between these ratios may also be provided. The ESA-to-VAI ratios for packages 14 may be changed with either or both of the size or shape of package 14 and the volume of active ingredient stored in interior region 20.

According to the preferred embodiment of the present disclosure, package 14 has a ratio of total exterior surface area 44 to weight of active ingredient stored in interior region 20 (the "ESA-to-WAI" ratio). As discussed above, exterior surface area 44 of the preferred embodiment is about 433 square centimeters. As shown in Table 1, the weight of material stored in interior region 20 may range from 0.0147 to 69.35 grams resulting in a ESA-to-WAI ratio ranging from 6.24 to 29,445 square centimeters/gram. According to other embodiments, other ESA-to-WAI ratios for packages 14 may be provided, such as 0.1; 0.2; 0.5; 1.0; 2.0; 4.0; 5.0; 6.0; 7.0; 8.0; 9.0; 10; 12.5; 15; 20; 30; 50; 60; 70; 80; 90; 100; 125; 250; 500; 1,000; 2,000; 3,000; 4,000; 5,000; 7,500; 10,000; 15,000; 20,000; 30,000; 40,000; 60,000; 80,000; and 100,000 centimeters/gram. Other ESA-to-WAI ratios that are smaller, larger, or in between these ratios may also be provided. The ESA-to-WAI ratios for packages 14 may be changed with either or both of the size or shape of package 14 and the weight of active ingredient stored in interior region 20.

Figure 6:
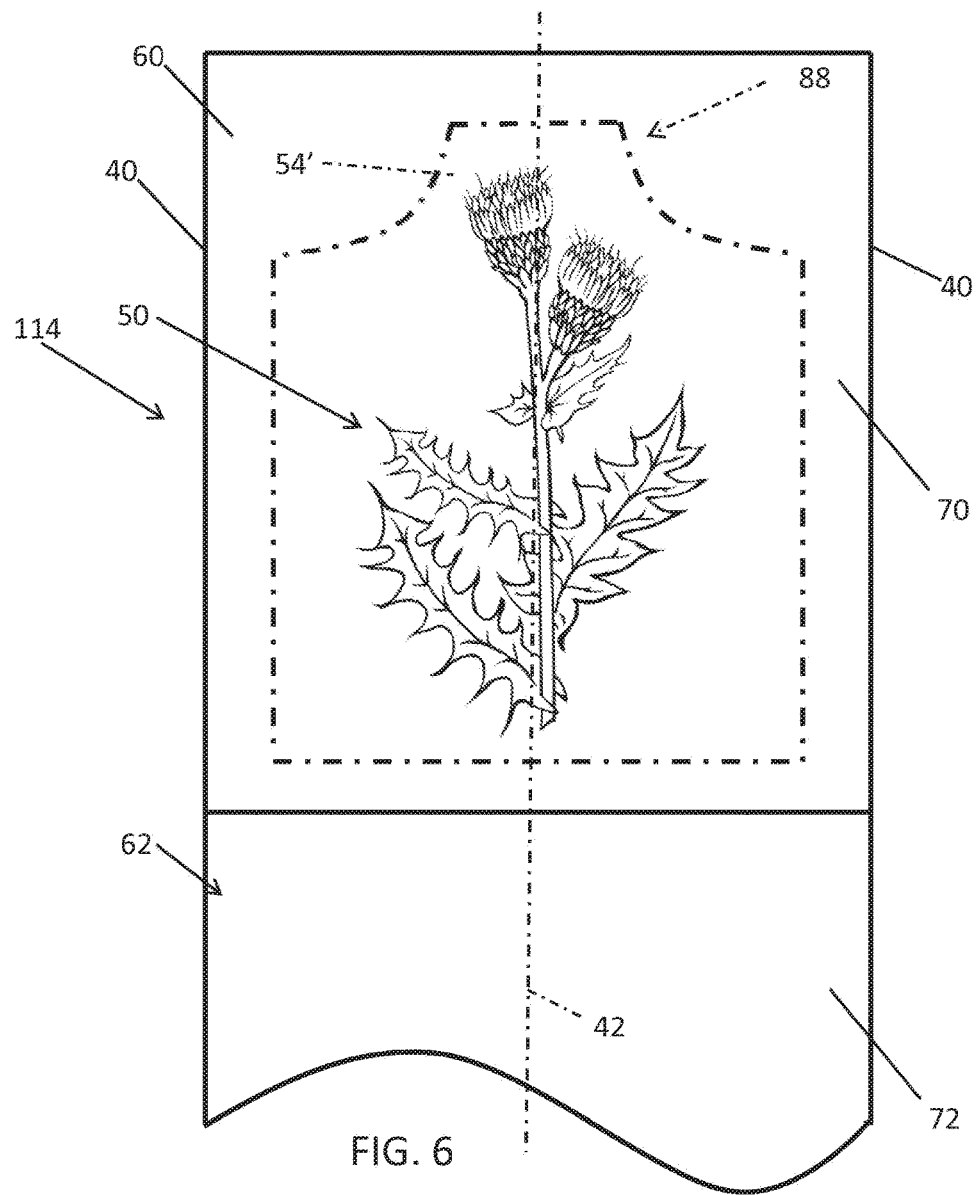
FIG. 6 is a view similar to FIG. 3 showing an upper portion of an alternative embodiment package showing the upper portion sealed along a path (shown in dashed lines) with an upper portion of the path necked down to form a funnel for directed discharge of the agriculturally active ingredient if the upper portion of the path is cut.

A portion of an alternative embodiment package 114 is shown in FIG. 6. Package 114 is similar to package 14 with the exception that seal 54' necks down at the top of package 114. The necking down of seal 54' defined a funnel 88 for material 16 to flow through during dispersal of material 16 out of package 14'. A user cuts package 14' across the top of funnel 88 to open package 14'. The user then squeezes package 14' to direct material 16 through funnel 88 into container 24.

Figure 7:
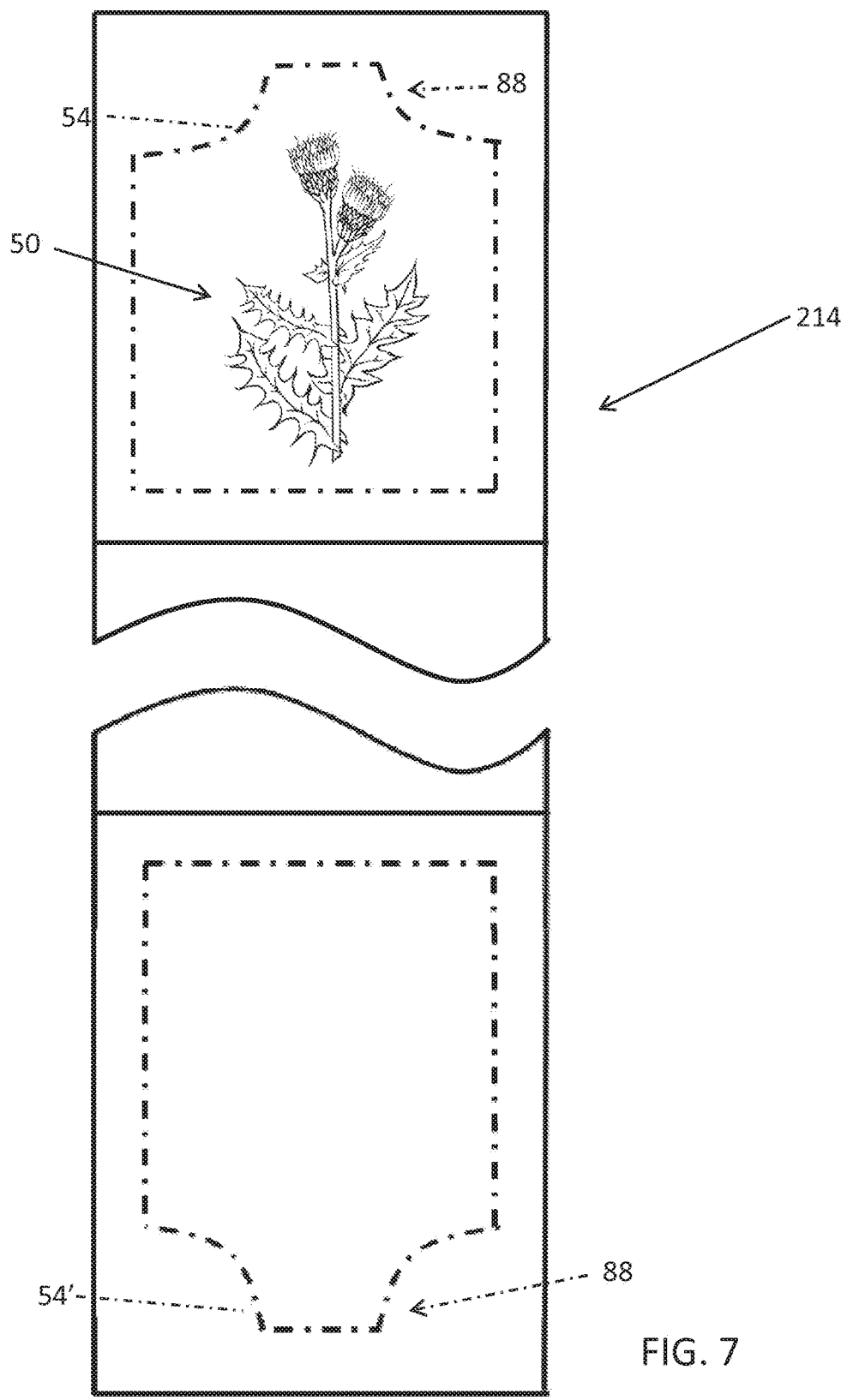
FIG. 7 is a view similar to FIG. 6 showing upper and lower portions of an alternative embodiment package showing the upper and lower portions of the package sealed along paths (shown in dashed lines) with the upper and lower portions necked down to form funnels.

Portions of another alternative embodiment package 214' are shown in FIG. 7. Package 214' is similar to package 114 with the exception that two seals 54' are provided, one on the top of package 214' and one on the bottom of package 214. The active ingredients 12 in each sealed volume may be the same or they may be different. By providing multiple sealed volumes, a user may use the active ingredients at different times. For example, the user may use the active ingredient 16 from one of the sealed volume for a first course of treatment and the active ingredient 16 from the other sealed volume for a second course of treatment. For some treatments, the first and second courses may require the same active ingredients 16. For some treatments, the first and second courses may require different active ingredients.

Figure 8:
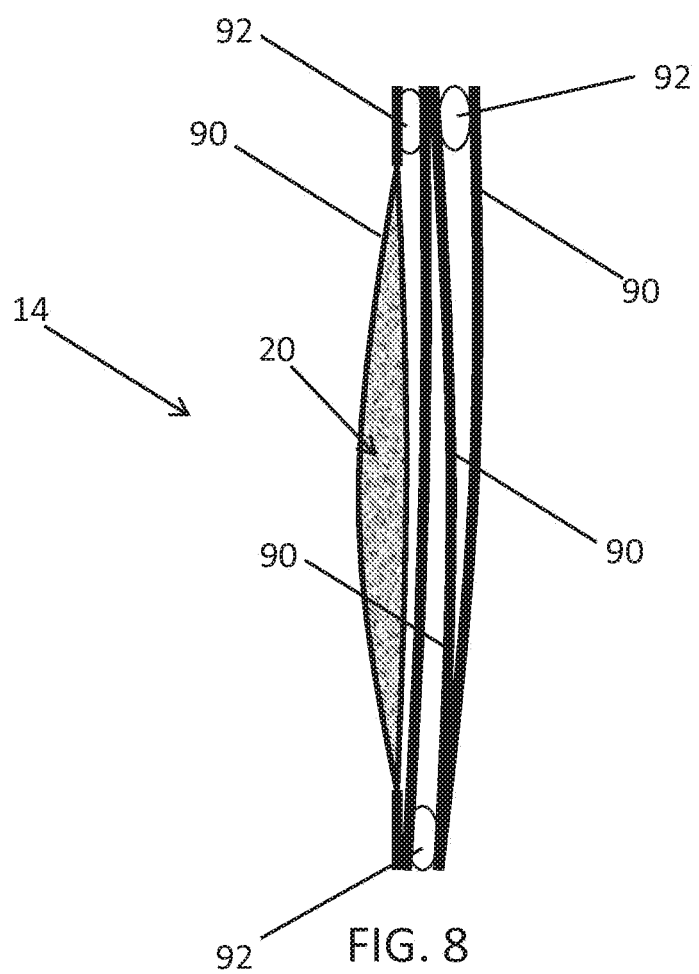
FIG. 8 is a cross-sectional view of the agriculturally active product of FIG. 1 showing the package folded into sections that are coupled together with adhesive.

Package 14 (and packages 114, 214) may be folded to provide a more compact arrangement as shown in FIG. 8. When folded, package 14 preferably includes multiple folds 90, one of which includes interior region 20. According to one embodiment, adhesive 92 is provided between adjacent folds 90 to adhere adjacent folds 90 together.

Figure 9:
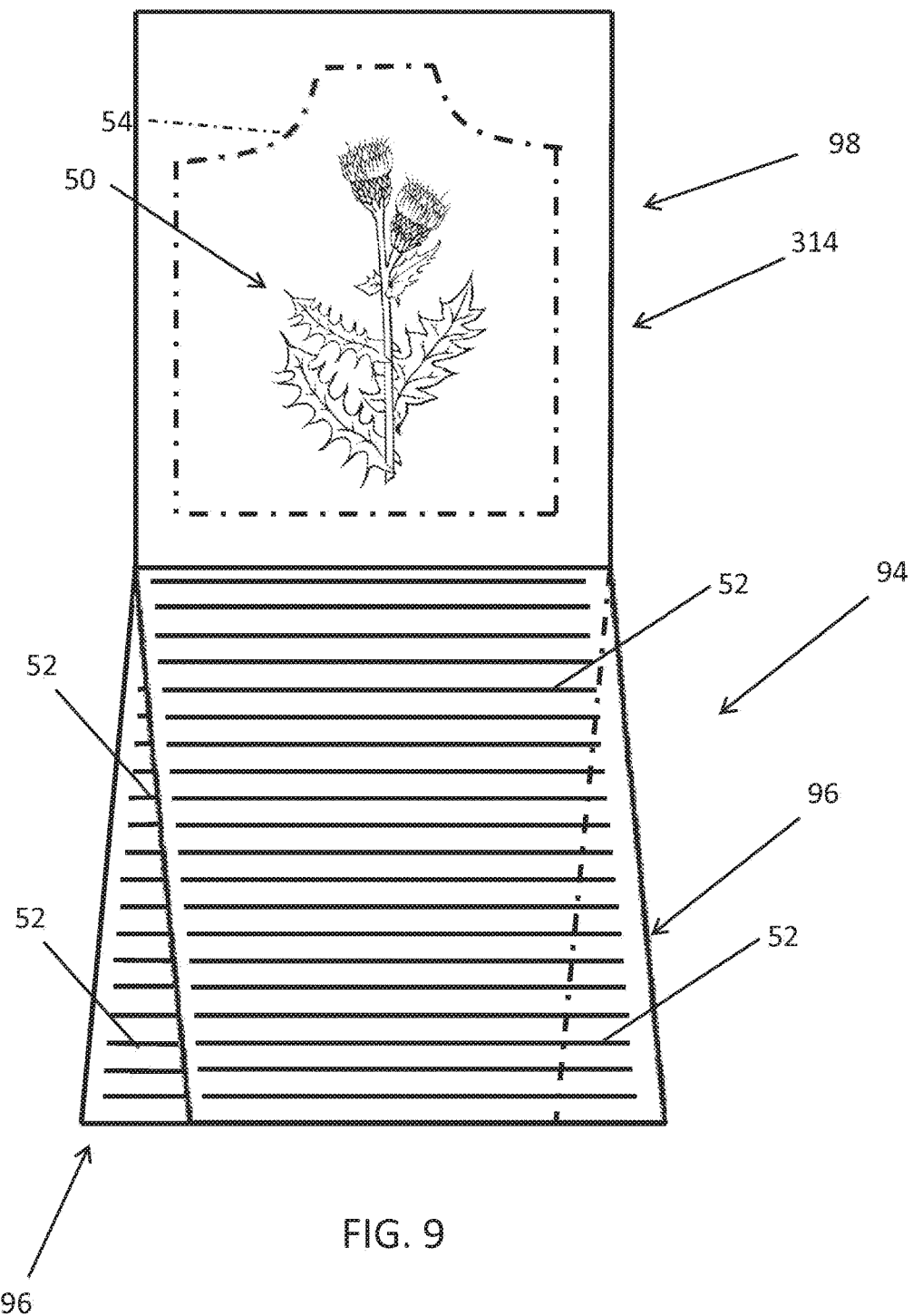
FIG. 9 is a view of an alternative embodiment package showing the package including an upper portion and a pair of lower portions.

Another alternative embodiment package 314 is shown in FIG. 9. Package 314 is similar to package 14 with the exception that a lower portion 94 is split into two flaps 96. An upper portion 98 includes interior region 20. Text 52 (and/or graphics) may be provided on either or both sides of flaps 96 of lower portion 94 and upper portion 98. Each side of flaps 96 and each side of upper portion 98 cooperate to define the exterior surface area of package 314. As a result, the overall height of package 314 can be reduce while maintaining the same exterior surface area when compared to packages 14, 114, 214.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. An agriculturally active product including:
    an initial volume of an agriculturally active ingredient; and
    a package having an interior region containing the initial volume, the package having an exterior surface area, a ratio of the exterior surface area to the initial volume being greater than 500 square centimeters per milliliter.

2. The agriculturally active product of claim 1, wherein the initial volume of the agriculturally active ingredient is sufficient to effectively treat a coverage area of vegetation, a ratio of the initial volume to the coverage area being 0.1 quarts per 100 square feet to 100 quarts per 100 square feet.

3. The agriculturally active product of claim 1, wherein the ratio of the exterior surface area to the initial volume is greater than 1,000 square centimeters per milliliter.

4. The agriculturally active product of claim 1, wherein the ratio of the exterior surface area to the initial volume is greater than 10,000 square centimeters per milliliter.

5. The agriculturally active product of claim 1, wherein the package has at least one sealed storage portion containing the initial volume and a remainder portion coupled to the at least one sealed storage portion, wherein the exterior surface area of the storage portion is less than the exterior surface area of the remainder portion.

6. The agriculturally active product of claim 5, wherein a ratio of the exterior surface area of the storage portion to the exterior surface area of the remainder portion is 0.50 or less.

7. The agriculturally active product of claim 1, wherein the package includes at least one sealed storage portion defining the interior region, the at least one sealed storage portion having a total interior surface area, a ratio of the exterior surface area to the total interior surface area is greater than 1.75.

8. An agriculturally active product including:
    an initial weight of an agriculturally active ingredient; and
    a package having an interior region containing the initial weight, the package having an exterior surface area, a ratio of the exterior surface area to the initial weight being greater than 500 square centimeters per gram.

9. The agriculturally active product of claim 8, wherein the ratio of the exterior surface area to the initial weight is greater than 1,000 square centimeters per milliliter.

10. The agriculturally active product of claim 8, wherein the ratio of the exterior surface area to the initial weight is greater than 10,000 square centimeters per milliliter.

11. The agriculturally active product of claim 8, wherein the package has at least one sealed storage portion containing the initial weight and a remainder portion coupled to the at least one sealed storage portion, wherein the exterior surface area of the storage portion is less than the exterior surface area of the remainder portion.

12. The agriculturally active product of claim 11, wherein a ratio of the exterior surface area of the storage portion to the exterior surface area of the remainder portion is 0.50 or less.

13. The agriculturally active product of claim 8, wherein the package includes at least one sealed storage portion defining the interior region, the at least one sealed storage portion having a total interior surface area, a ratio of the exterior surface area to the total interior surface area is greater than 1.75.

14. An agriculturally active product including:
    a volume of material including an agriculturally active ingredient, and
    a package having a package centroid, an interior region, and a distant portion positioned farthest away from the package centroid, the interior region having an interior region centroid and containing the volume of material, the interior region centroid being spaced apart from the package centroid by an offset distance, the distant portion being spaced apart from the package centroid by a farthest distance, a ratio of the offset distance to the farthest distance being greater than 0.10, wherein the package centroid is separated from the volume of material in the package.

15. The agriculturally active product of claim 14, wherein the package has at least one sealed storage portion and a remainder portion coupled to the at least one sealed storage portion, the at least one sealed storage portion includes the interior region, the at least one sealed storage portion has a first exterior surface area, the remainder portion has a second exterior surface area, a ratio of the first exterior surface area to the second exterior surface area is less than 1.25.

16. The agriculturally active product of claim 14, wherein the ratio of the offset distance to the farthest distance is greater than 0.4.

17. The agriculturally active product of claim 14, wherein the ratio of the offset distance to the farthest distance is greater than 0.75.

18. The agriculturally active product of claim 14, wherein package is substantially flat.

19. The agriculturally active product of claim 14, wherein the package has a sealed storage portion and a remainder portion coupled to the sealed storage portion, the sealed storage portion contains the volume of the material, the remainder portion has an exterior surface area, a ratio of the exterior surface area to the volume is greater than 5 square centimeters per milliliter.

20. The agriculturally active product of claim 14, wherein the package is substantially flat and has at least one sealed storage portion, the at least one sealed storage portion includes a total interior surface area defining the interior region, the package has an exterior surface area, a ratio of the exterior surface area to the total interior surface area is greater than 1.75.

* * * * *